(12) United States Patent
Suggs

(10) Patent No.: US 9,632,604 B2
(45) Date of Patent: Apr. 25, 2017

(54) INPUT COMPONENTS OF A DEVICE

(75) Inventor: Bradley Neal Suggs, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 792 days.

(21) Appl. No.: 13/431,949

(22) Filed: Mar. 27, 2012

(65) Prior Publication Data

US 2013/0262719 A1    Oct. 3, 2013

(51) Int. Cl.
| G06F 13/12 | (2006.01) |
| H04W 4/00 | (2009.01) |
| G06F 3/038 | (2013.01) |
| H04L 29/08 | (2006.01) |
| H04W 12/06 | (2009.01) |

(52) U.S. Cl.
CPC ............ G06F 3/038 (2013.01); H04L 67/306 (2013.01); H04W 12/06 (2013.01); *G06F 2203/0381* (2013.01); *G06F 2203/0384* (2013.01); *H04W 4/00* (2013.01)

(58) Field of Classification Search
USPC .......................................................... 710/62
See application file for complete search history.

(56) References Cited

U.S. PATENT DOCUMENTS

| 5,148,155 A * | 9/1992 | Martin et al. .................. 345/173 |
| 5,706,031 A * | 1/1998 | Brendzel .................. G06F 3/023 345/157 |
| 7,912,503 B2 * | 3/2011 | Chang ............... H04M 1/72527 455/552.1 |
| 8,325,151 B1 * | 12/2012 | Chan et al. .................... 345/173 |
| 8,509,754 B2 * | 8/2013 | Poplett et al. ................ 455/418 |
| 2005/0007343 A1 * | 1/2005 | Butzer ................ G06F 3/03543 345/163 |
| 2006/0085757 A1 * | 4/2006 | Andre et al. ................... 715/771 |
| 2008/0225006 A1 * | 9/2008 | Ennadi .......................... 345/171 |
| 2010/0248784 A1 * | 9/2010 | Stolarz ............. H04M 1/72527 455/559 |
| 2011/0230178 A1 * | 9/2011 | Jones ................. H04M 1/0235 455/422.1 |
| 2012/0214462 A1 * | 8/2012 | Chu et al. ..................... 455/418 |
| 2013/0027290 A1 * | 1/2013 | Wong et al. ................... 345/156 |
| 2013/0091205 A1 * | 4/2013 | Kotler ................ H04L 65/4015 709/204 |

OTHER PUBLICATIONS

Andrew Gluck, GoToMyPC Launches iPad App Allowing You to Control Your PC From Your Tablet, Advisors4Advisors, Mar. 1, 2011 retrieved from the Internet on Mar. 27 2012, http://advisorsforadvisors.com/index.php?option=com_content&view=article&id=12589:gotomypc-launches-ipad-app-allowing-you-to-control-your-pc-from-your-tablet&catid=322:hardward&Itemid=267.

(Continued)

*Primary Examiner* — Titus Wong
(74) *Attorney, Agent, or Firm* — HP Inc. Patent Department

(57) ABSTRACT

Examples disclose a device including a communication component to couple the device to a first portable computing device and a second portable computing device through a communication channel and a controller to utilize the first portable computing device as a first input component of the device and utilize the second portable computing device as a second input component of the device through the communication channel.

20 Claims, 5 Drawing Sheets

(56) References Cited

OTHER PUBLICATIONS

Bob Russell, Control your desktop PC from a smartphone (including iPhone) with RDM+, MobileRead, Dec. 18, 2007, retrieved from the Internet Mar. 27, 2012, http://www.mobileread.com/forums/showthread.php?t=17532.

Prakash Shetty, Control your PC's Mouse/Keyboard using your Smartphone/Tablet,Google Groups, Mar 18, 2011, retrieved from the Internet Mar. 27, 2012,http://groups.google.com/group/blackberry-india/browse_thread/86904cd257b8ff9c/84bcd0308dba1e6d?show_docid=84bcd0308dba1e6d&pli=1.

Rick Broida, Use Your Smartphone to Control Your PC or Media Center, PCWorld, Jun. 18, 2010, retrieved from the Internet on Mar. 27, 2012, http://www.pcworld.com/article/199240/use_your_smartphone_to_control_pc_or_media_center.html.

Tom's Hardware, PPC Tablet Remote Control Suite—use Pocket PC to Control Suite, retrieved from the Internet March 27, 2012, http://www.tomshardware.com/forum/ 24300-36-tablet-remote-control-suite-pocket-contro.

\* cited by examiner

INPUT COMPONENTS OF A DEVICE

BACKGROUND

When interacting with a device, a user can access one or more input components specific to the device, such as a keyboard and/or a mouse. In some instances the input components can be damaged or be stowed in a location unknown to the user. As the user spends time fixing or searching for the input components, time can be wasted and the user can become frustrated. If the user is unable to access or locate the input components, the user will be unable to utilize the device and access contents of the device.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

A device can include a communication component, such as a wireless radio, a BLUETOOTH® component, and/or a near field communication component to couple the device to a first portable computing device and a second portable computing device through a communication channel. In one example, the first portable computing device can be a tablet and the second portable computing device can be a smart phone. The first portable computing device can be utilized as a first input component, such as a keyboard, of the device and the second portable computing device can be utilized as a second input component, such as a mouse, of the device through the communication channel. As a result, a user can conveniently utilize his or her personal and portable computing devices as input components for a device.

In one embodiment, when the first portable computing device is utilized as a first input component, the first portable computing device can render a virtual keyboard for a user of the device to interact with. Additionally, when operating as second input component, a sensor of the second portable computing device can detect for the user positioning the second portable computing device. In one embodiment, the communication channel of the device includes a first communication channel to receive a first mode of input from the first portable computing device and a second communication channel to receive a second mode of input from the second portable computing device. As a result, the device can accurately distinguish between keyboard inputs received from the first portable computing device and pointer inputs received from the second portable computing device.

Figure 1:
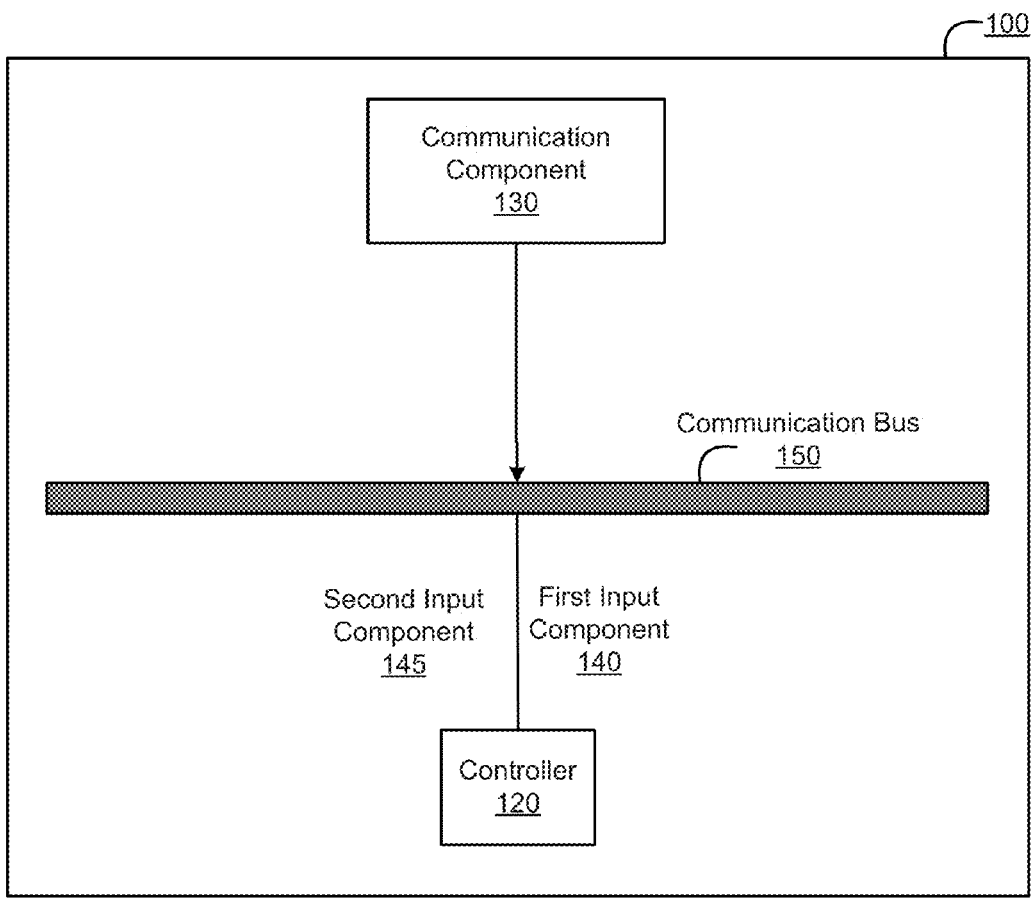
FIG. 1 illustrates a device to couple with a first portable computing device and a second portable computing device according to an example.
Figure 1:
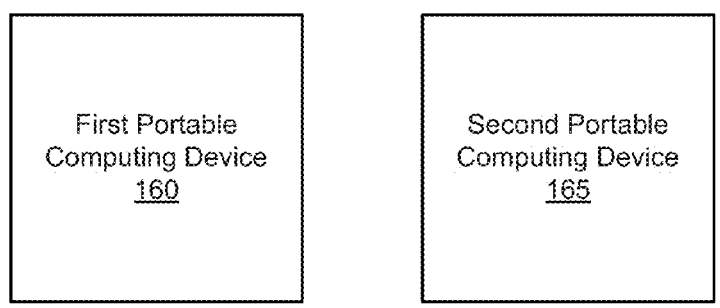

FIG. 1 illustrates a device 100 to couple with a first portable computing device 160 and a second portable computing device 165 according to an example. The device 100 can be a stationary computing device, such as a desktop, a server, an all-in-one system, and/or a kiosk. In another embodiment, the device 100 can be a laptop, a notebook, an E (Electronic)-Reader, and/or any additional computing device which can couple to a first portable computing device 160 and a second portable computing device 165. The device 100 includes a communication component 130, a controller 120, and a communication bus 150 for components of the device 100 to communicate with one another. In one embodiment, the device 100 includes an input application which can be utilized independently and/or in conjunction with the controller 120 to manage the device 100. The input application can be a firmware or application executable by the controller 120 from a non-transitory computer readable memory of the device 100.

The communication component 130 is a hardware component of the device 100, such as a BLUETOOTH® component, a wireless radio, an infrared component, and/or a near field communication component which couples the device 100 to a first portable computing device 160 and a second portable computing device 165 through a communication channel. In one embodiment, the first portable computing device 160 and the second portable computing device 165 can be authenticated by the controller 120 and/or the input application before they are coupled to the device 100. For the purposes of this application, the first portable computing device 160 can be a tablet, a smart phone, an E-Reader, and/or any additional portable computing device which can couple to the device 100. The second portable computing device 165 can be a smart phone, a personal digital assistant, a media player, and/or any additional portable computing device which can couple to the device 100.

In response to the device 100 coupling to the first portable computing device 160 and the second portable computing device 165, the controller 120 and/or the input application can load firmware and/or drivers corresponding to a first input component 140 and a second input component 145 of the device 100. For the purposes of this application, an input component of the device 100 is a hardware input device, such as a keyboard, a mouse, a pointing device, a touchpad, and/or a touch screen, which can receive input for the device 100. Using the firmware and/or drivers, the controller 120 and/or the input application can utilize the first portable computing device 160 as a first input component 140 of the device 100 and the second portable computing device 165 can be utilized as a second input component 145 of the device 100.

For example, the controller 120 and/or the input application can utilize the first portable computing device 160 as a keyboard of the device 100 and the second portable computing device 165 can be utilized as a mouse or pointer of the device 100. The controller 120 and/or the input application can receive one or more inputs from the first portable computing device 160 and the second portable computing device 165 through a communication channel. For the purposes of this application, the communication channel includes a wireless communication channel for the controller 120 and/or the input application to wirelessly communicate with the first portable computing device 160 and the second portable computing device 165.

In one embodiment, the communication channel includes a first communication channel and a second communication channel. The first communication channel is used by the controller 120 and/or the input application to communicate and receive a first mode of inputs from the first portable computing device 160. The second communication channel is separate from the first communication channel and is used by the controller 120 and/or the input application to communicate and receive a second mode of inputs from the second portable computing device 165. For the purposes of this application, the first mode of inputs corresponds to alphanumeric inputs, functional inputs, and/or special command inputs which can be received from a keyboard. The second mode of inputs corresponds to pointer inputs or mouse inputs which can be received from a mouse or pointing device.

Figure 2A:
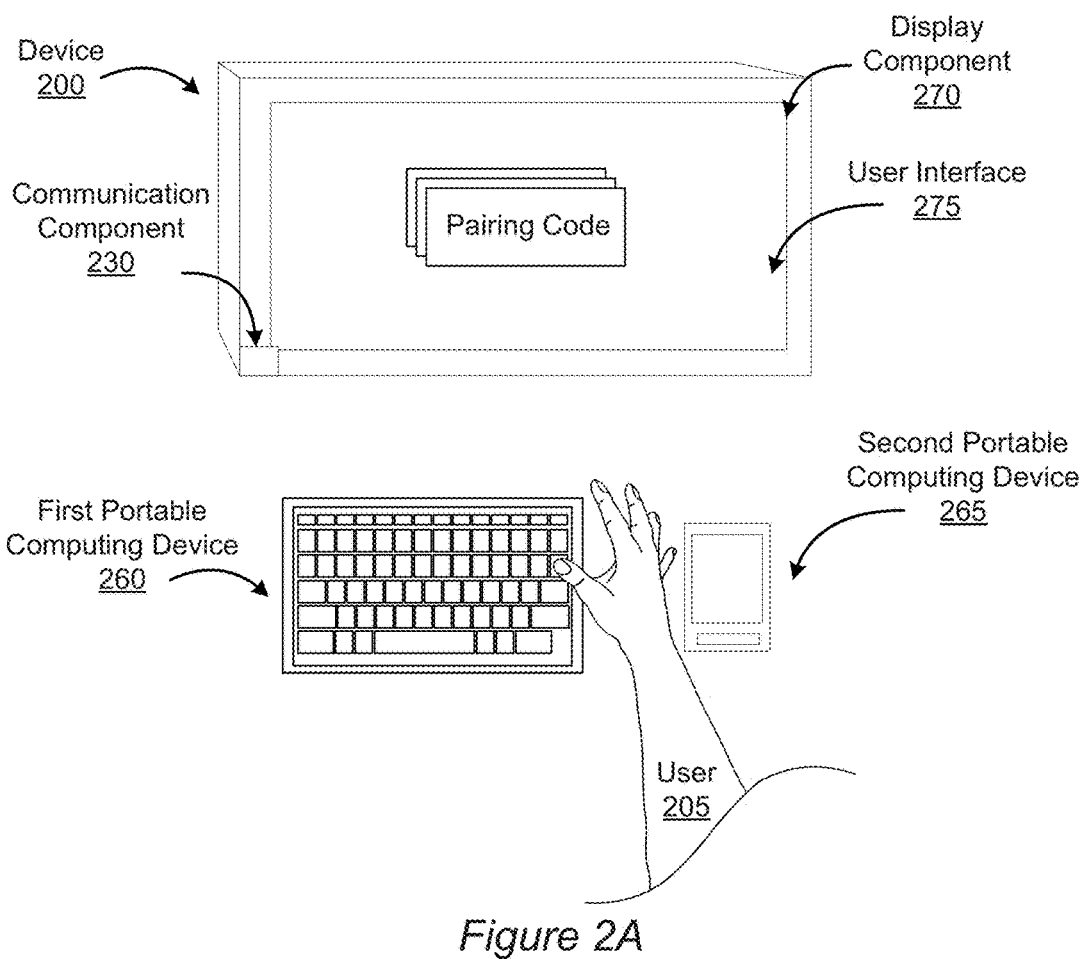
FIG. 2A and FIG. 2B illustrate a first portable computing device and a second portable computing device operating as input components of a device according to an example.
Figure 2B:
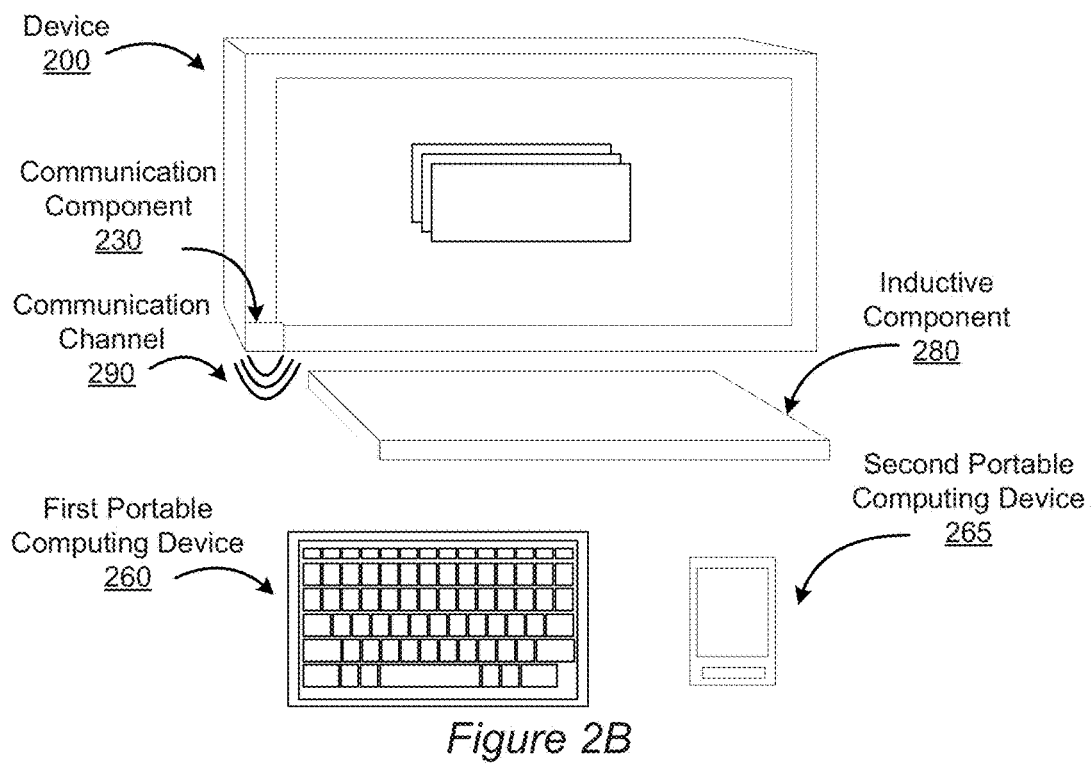

FIG. 2A and FIG. 2B illustrate a first portable computing device 260 and a second portable computing device 265 as input components of a device 200 according to an example. The device 200 can be a stationary computing device, such as a server, a desktop, an all in one, and/or a kiosk. In one embodiment, as shown in FIG. 2A, the first portable computing device 260 can be a tablet. In another embodiment, the first portable computing device 260 can be an E-Reader, a smart phone, and/or any additional portable computing device which includes a touch screen. The second portable computing device 265 can be a smart phone, a personal digital assistance, a media player, and/or any additional portable computing device. Similar to the first portable computing device 260, the second portable computing device 265 can include a touch screen. In another embodiment, the second portable computing device 265 can include a sensor, such as an image capture component, a gyroscope, accelerometer, and/or a global positioning system which can detect a movement of the second portable computing device 265.

A communication component 230 of the device 200 can initially be used to couple the device 200 to the first portable computing device 260 and the second portable computing device 265. For the purposes of this application, the communication component 230 is a hardware component of the device 200 which wirelessly communicates with the first and second portable computing devices. The communication component 230 can include a BLUETOOTH® component, an infrared component, a wireless radio, and/or a near field communication component. In one embodiment, if the communication component 230 includes more than one communication device, such as a near field communication component and a wireless radio, the first portable computing device 260 can be coupled to the device 200 through the near field communication component while the second portable computing device 265 is coupled to the device 200 through the wireless radio.

When coupling the device 200 to the portable computing devices, a controller and/or an input application instruct the communication component 230 to send a request for the first portable computing device 260 and the second portable computing device 265 to pair with the device 200. The request can be sent as a file, a message, and/or a data packet to the first portable computing device 260 and the second portable computing device 265. In one embodiment, the request can instruct the first portable computing device 260 and the second portable computing device 265 to authenticate themselves to the device 200 with a pairing code. For the purposes of this application, a pairing code includes a sequence of alphanumeric characters and/or numbers which a user 205 can enter into the first portable computing device 260 and the second portable computing device 265.

In one embodiment, the pairing code can be displayed on a display component 270 of the device 200. The display component 270 is a hardware output component which can display the pairing code on a user interface 275 for a user 205 of the device 200 to view and/or interact with. In one embodiment, the display component 270 is a LCD (liquid crystal display), a LED (light emitting diode) display, a CRT (cathode ray tube) display, a plasma display, a projector and/or any additional device configured to display the pairing code. Once the pairing code has been entered into the portable computing devices, the first portable computing device 260 and the second portable computing device 265 can be authenticated and be coupled to the device 200. In another embodiment, the first portable computing device 260 and/or the second portable computing device 265 can automatically generate a code, such as a quick response code and/or a WIFI protected setup code, for the device 200 to authenticate the portable computing devices with.

In other embodiments, as illustrated in FIG. 2B, the device 200 can include an inductive component 280. If the device 200 includes an inductive component 280, the inductive component 280 can be used, as opposed to a pairing code, to authenticate the first and second portable computing devices. For the purposes of this application, the inductive component 280 is an electromagnetic hardware component of the device 200 which can detect if the first and second portable computing devices are within proximity of an electromagnetic field produced by the inductive component 280. In one embodiment, the inductive component 280 includes one or more inductive coils to generate an electromagnetic field. In another embodiment, the inductive component 280 includes electrical contacts for the portable computing devices to interface with.

The portable computing devices are within proximity of the inductive component 280 if the portable computing devices are contacting the inductive component 280 or if the portable computing devices are within the electromagnetic field. If either of the portable computing devices are within proximity of the inductive component 280, the controller and/or the input application can authenticate the portable computing devices without entering a paring code. In one embodiment, the inductive component 280 is coupled to a power source and the inductive component 280 can supply power to the first portable computing device 260 and/or the second portable computing device 265 if the portable computing devices are within proximity of the inductive component 280.

In response to the first and second portable computing devices being authenticated and coupling to the device 200, the controller and/or the input application can proceed to load drivers corresponding to a first input component and a second input component. As noted above, an input component is a hardware input device, such as a keyboard, a mouse, a pointer, a touchpad, a touch surface, and/or a touch screen to receive inputs for the device 200. The drivers for the input components can include firmware and/or software application which is stored on the device 200, the first portable computing device 260, the second portable computing device 265, and/or through a server accessible to the device 200. Once the drivers has been loaded onto the device 200, the first portable computing device 260 can be utilized as a first input component of the device 200 and the second portable computing device 265 can be utilized as a second input component of the device 200.

When operating as a first input component, the first portable computing device 260 can launch a keyboard application for the first portable computing device 260 to operate as a keyboard input component. When operating as a keyboard input component, the keyboard application can detect a first mode of input from the user 205. The keyboard application can also render a virtual keyboard on a touchscreen of the first portable computing device 260. The keyboard application identifies to the device 200 any touch input on the virtual keyboard as a keyboard input from the first portable computing device 260. The keyboard application can reside on the first portable computing device 260. In another embodiment, the keyboard application resides on the device 200 and the keyboard application can be transmitted to the first portable computing device 260 if the first portable computing device 260 couples to the device 200.

Similar to the first portable computing device 260, the second portable computing device 265 can launch a pointer application on the second portable computing device 265. The pointer application can detect a second mode of inputs from the second portable computing device 265. In one embodiment, the pointer application can use a sensor, such as an image capture component, a gyroscope, an accelerometer, and/or a global positioning system of the second portable computing device 265 to detect for any movements. In another embodiment, the second portable computing device 265 renders a virtual touch pad on a touchscreen of the second portable computing device 265 and the second portable computing device 265 detects touch inputs from the user 205.

The pointer application identifies to the device 200 any movement or touch input from the second portable computing device 265 as a pointer input from the second portable computing device 265. The pointer application can reside on the second portable computing device 265. In another embodiment, the pointer application can reside on the device 200 and the pointer application can be transmitted to the second portable computing device 265 in response to the second portable computing device 265 coupling to the device 200.

In one embodiment, if the keyboard application and/or pointer application is launched, additional functions or applications, such as email or web browsing, of the first portable computing device 160 and/or the second portable computing device 265 can be disabled or restricted from access. The first mode of inputs and the second mode of inputs from the portable computing devices are transmitted to the device 200 through a communication channel 290. As noted above, the communication channel 290 is a wireless communication channel for the controller and/or the input application to receive input data from the first and second portable computing devices.

Figure 3:
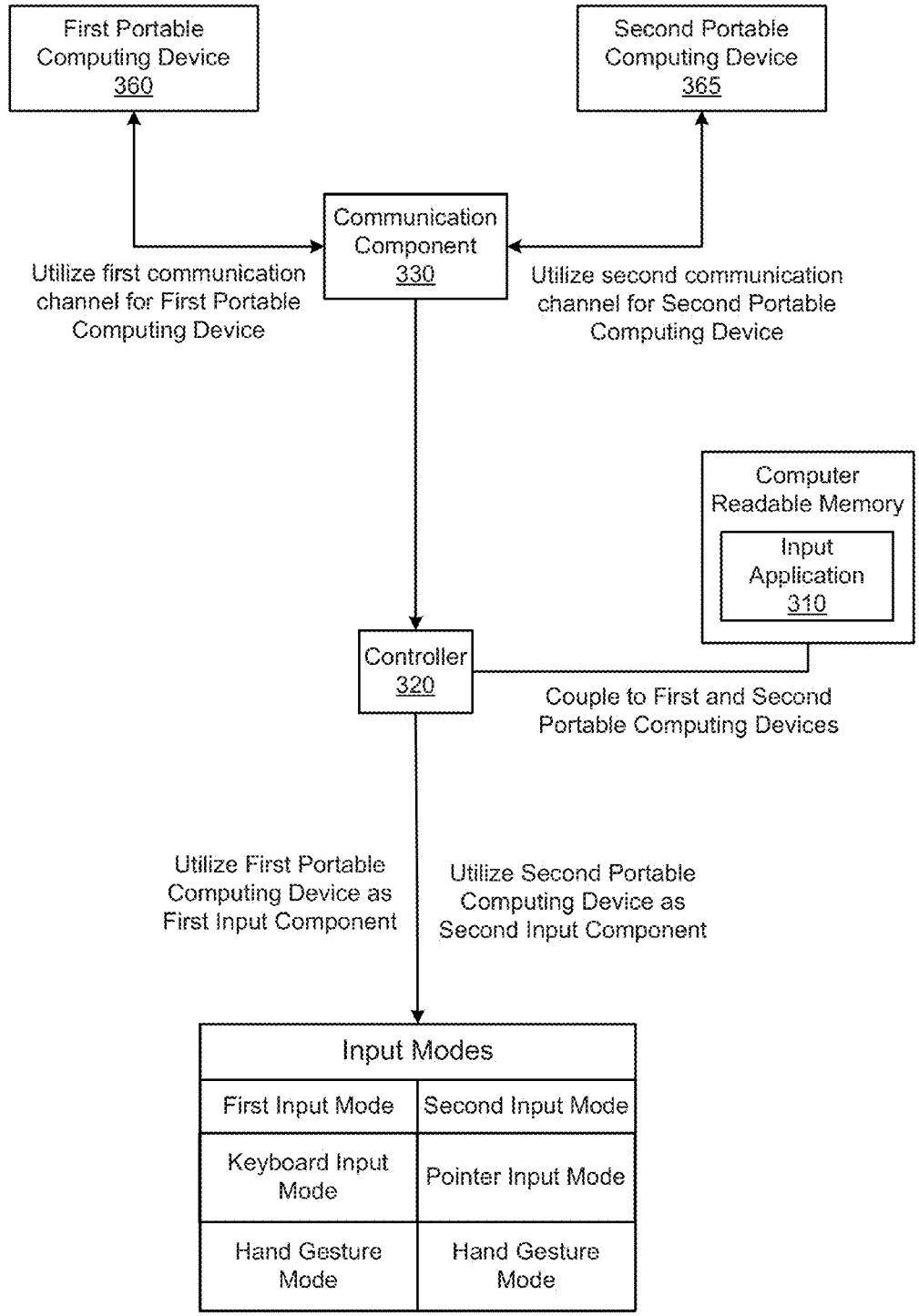
FIG. 3 illustrates a block diagram of an input application utilizing a first portable computing device as a first input component and utilizing a second portable computing device as a second input component for a device according to an example.

FIG. 3 illustrates a block diagram of an input application 310 utilizing a first portable computing device 360 as a first input component and utilizing a second portable computing device 365 as a second input component for a device according to an example. As noted above, the input application 310 can be utilized independently and/or in conjunction with the controller 320 to manage the device. In one embodiment, the input application 310 can be a firmware embedded onto one or more components of the device. In another embodiment, the input application 310 can be an application accessible from a non-volatile computer readable memory of the device. The computer readable memory is a tangible apparatus that contains, stores, communicates, or transports the application for use by or in connection with the device. In one embodiment, the computer readable memory is a hard drive, a compact disc, a flash disk, a network drive or any other form of tangible apparatus coupled to the device.

The first portable computing device 360 and the second portable computing device 365 couple to the controller 320 and/or the input application 310 through a communication channel. In one embodiment, the communication channel includes a first communication channel and a second communication channel. The controller 320 and/or the input application 310 use the first communication channel to receive a first mode of inputs from the first portable computing device 360 and the second communication channel is used to receive a second mode of inputs from the second portable computing device 365.

In one embodiment, the first communication channel for the first portable computing device 360 can utilize a first communication protocol which is different from a second communication protocol used for the second communication channel for the second portable computing device 365. A communication protocol can include a wireless radio protocol, a. BLUETOOTH® protocol, an infrared protocol, a near field communication protocol, and/or any additional wireless communication protocol to receive a first mode of inputs from the first portable computing device. 360 and a second mode of inputs from the second portable computing device 365. For example, a near field communication protocol can be used for the first communication channel between the device and the first portable computing device 360 and a wireless radio protocol can be used for the second communication channel between the device and the second portable computing device 365.

The device can include a first input mode for the first portable computing device 360 and a second input mode for the second portable computing device 365. In one embodiment, the first input mode includes a keyboard input mode. The second input mode can include a pointer input mode. The keyboard input mode corresponds to alphanumeric inputs, function inputs, and/or special command inputs which can be received from a keyboard. The pointer input mode corresponds to pointer inputs or mouse inputs which can be received from a mouse or pointing device. In other embodiments, the first input mode and/or the second input mode of the device can include a touch gesture input mode and/or any additional input modes in addition to and/or in lieu of those noted above.

The controller 320 and/or the input application 310 can prompt a user to specify whether the first portable computing device 360 is to operate in the keyboard input mode or the touch gesture input mode. Additionally, the controller 320 and/or the input application 310 can prompt a user to specify whether the second portable computing device 365 is to operate in the pointer input mode or the touch gesture input mode. The prompt can be displayed on the first portable computing device 360 and/or the second portable computing device 365 for the user to select. In other embodiments, the keyboard input mode and the pointer input mode can be selected by default by the controller 320 and/or the input application 310. Once the mode of inputs for the device are selected, the controller 320 and/or the input application 310 can receive the first mode of input from the first portable computing device 360 through the first communication channel and the second mode of input from the second portable computing device 365 can be received through the second communication channel.

Figure 4:
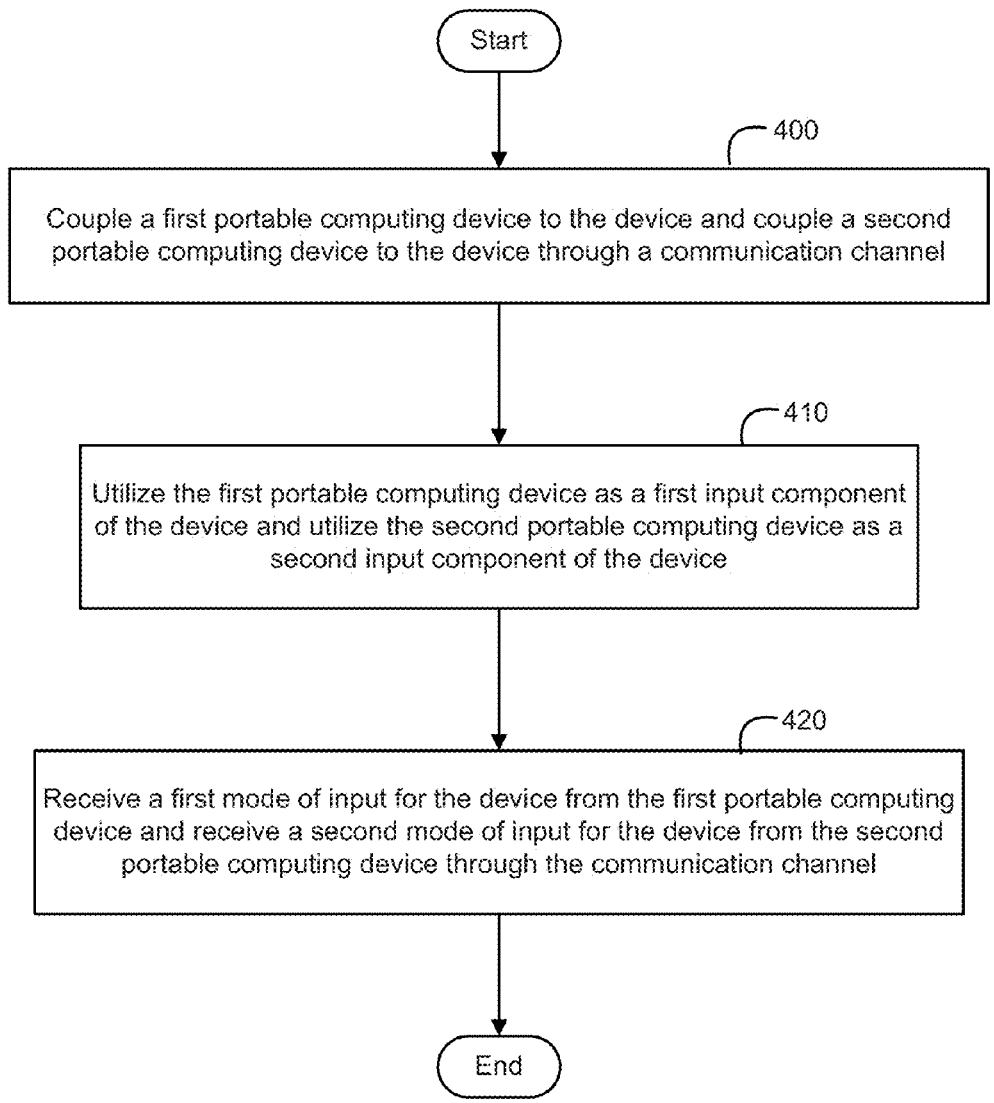
FIG. 4 is a flow chart illustrating a method for managing a device according to an example.

FIG. 4 is a flow chart illustrating a method for managing a device according to an example. The input application and/or the controller can instruct a communication component of the device to couple a first portable computing device to the device and couple a second portable computing device to the device through a communication channel at 400. In response to coupling to the portable computing devices, the controller and/or the input application utilize the first portable computing device as a first input component of the device and the second portable computing device can be utilized as a second input component of the device at 410. The first input component can be a keyboard input component and the second input component can be a pointer input component.

The controller and/or the input application receive a first mode of input from the first portable computing device and receive a second mode of input from the second portable computing device through the communication channel at 420. In one embodiment, the first mode of input from the first portable computing device can be received through a first communication channel and the second mode of input from the second portable computing device can be received through a second communication channel which is separate from the first communication channel. The method is then complete. In other embodiments, the method of FIG. 4 includes additional steps in addition to and/or in lieu of those depicted in FIG. 4.

Figure 5:
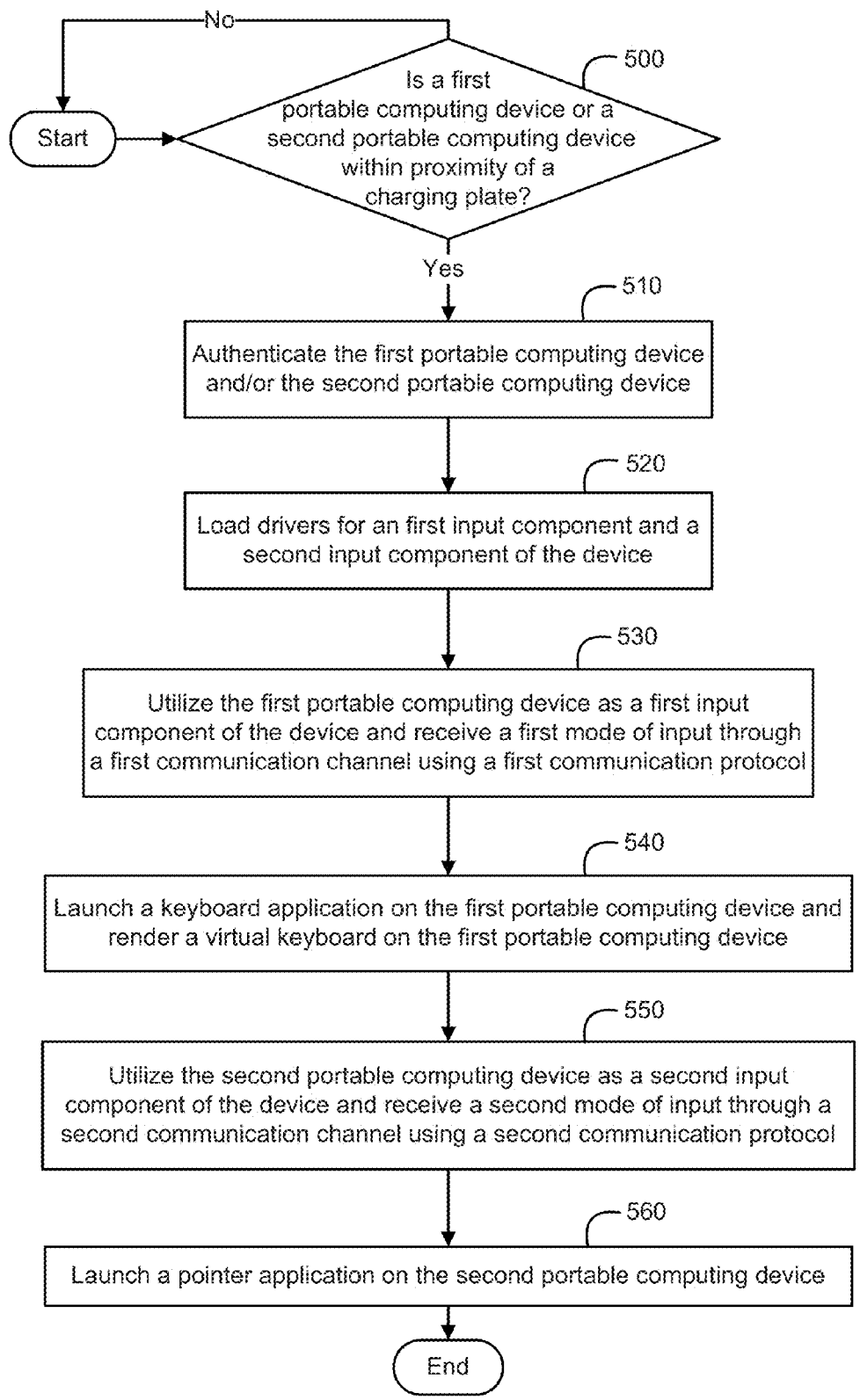
FIG. 5 is a flow chart illustrating a method for managing a device according to another example.

FIG. 5 is a flow chart illustrating a method for managing a device according to another example. The first portable computing device and the second portable computing device can initially be authenticated. In one embodiment, the controller and/or the input application determine if the first portable computing device or the second portable computing device are within proximity of a charging plate at 500. If the portable computing devices are within proximity of the charging plate, the portable devices can be authenticated at 510. In other embodiments, the controller and/or the input application can prompt the portable computing devices for a pairing code for authentication.

In response to authenticating the portable computing devices, the controller and/or the input application can load drivers for a first input component of the device and a second input component of the device at 520. The first portable computing device can then be utilized as a first input component of the device through a first communication channel with a first communication protocol at 530. The first portable computing device can also launch a keyboard application and render a virtual keyboard on the first portable computing device at 540.

The second portable computing device can also be used as a second input component of the device through a second communication channel using a second communication protocol at 550. The second portable computing device can launch a pointer application at 560. The controller and/or the input application receive a first mode of input from the first portable computing device and receive a second mode of input from the second portable computing device through the communication channel at. The method is then complete. In other embodiments, the method of FIG. 5 includes additional steps in addition to and/or in lieu of those depicted in FIG. 5.

What is claimed is:

1. A device comprising:
   a communication component to couple the device to a first portable computing device and a second portable computing device through a communication channel; and
   a controller to utilize the first portable computing device as a first input component of the device and utilize the second portable computing device as a second input component of the device through the communication channel;
   wherein launching a keyboard application on the first portable computing device and a pointer application on the second portable computing device disables the first portable computing device and the second portable computing device from accessing additional functions and applications.

2. The device of claim 1 wherein the first portable computing device is a tablet with a touch screen and the device uses the first portable computing device as a keyboard.

3. The device of claim 2 wherein the first portable computing device displays a virtual keyboard on the touch screen of the first portable computing device.

4. The device of claim 1 wherein the second portable computing device is at least one of a smart phone, a media player, and a personal digital assistant which the device utilizes as a pointing device.

5. The device of claim 4 wherein a touch screen of the second portable computing device is utilized as a touch pad for the device.

6. The device of claim 4 wherein a sensor of the second portable computing device detects a movement of the second portable computing device as an input for the device.

7. The device of claim 1 wherein the communication component includes at least one of a near field communication component, a BLUETOOTH® component, an infrared component, and a wireless radio component.

8. The device of claim 1 further comprising an inductive component to authenticate the first portable computing device and the second portable computing device.

9. A method for managing a device comprising:
   coupling a first portable computing device to the device and coupling a second portable computing device to the device through a communication channel;
   utilizing the first portable computing device as a first input component of the device and utilizing the second portable computing device as a second input component of the device; and
   receiving a first mode of input for the device from the first portable computing device and receiving a second mode of input for the device from the second portable computing device through the communication channel;
   transmitting a keyboard application from the device to the first portable computing device in response to the first portable computing device coupling to the device, the keyboard application configured to render a virtual keyboard and detect the first mode of input from a user; and
   transmitting a pointer application from the device to the second portable computing device in response to the second portable computing device coupling to the device, the pointer application configured to detect the second mode of input from a user.

10. The method for managing a device of claim 9 wherein coupling the first portable computing device to the device includes the device utilizing a first communication channel to receive the first mode of input.

11. The method for managing a device of claim 10 wherein the first communication channel uses a first communication protocol.

12. The method for managing a device of claim 10 wherein coupling the second portable computing device to the device includes utilizing a second communication channel separate from the first communication channel to receive the second mode of input.

13. The method for managing a device of claim 12 wherein the second communication channel uses a second communication protocol which is different from a first communication protocol used for the first communication channel.

14. The method for managing a device of claim 9 further comprising loading drivers of a first input component and a second input component.

15. A non-transitory computer readable medium comprising instructions that if executed cause a controller to:
couple a first portable computing device to a device through a communication channel and utilize the first portable computing device as a first input component of the device;
couple a second portable computing device to the device through the communication channel and utilize the second portable computing device as a second input component of the device;
utilize a first communication protocol for the first portable computing device, the first communication protocol is different from a second communication protocol for the second portable computing device; and
receive a first mode of input for the device from the first portable computing device and receive a second mode of input for the device from the second portable computing device through the communication channel.

16. The computer readable medium of claim 15 wherein the controller authenticates the first portable computing device and authenticates the second portable computing device before utilizing, them as input components for the device.

17. The computer readable medium of claim 16 wherein authenticating the first portable computing device includes determining if the first portable computing device is within proximity of a charging plate of the device.

18. The computer readable medium of claim 16 wherein authenticating the second portable computing device includes determining if the second portable computing device is within proximity of a charging plate of the device.

19. The device of claim 1 wherein an input application prompts a user to specify whether the first portable computing device is to operate in a keyboard input mode or a touch gesture input mode.

20. The method for managing a device of claim 9 further comprising prompting a user to specify whether the first portable computing device and the second portable computing device are to operate in a keyboard input mode or a touch gesture input mode.

* * * * *

UNITED STATES PATENT AND TRADEMARK OFFICE
CERTIFICATE OF CORRECTION

PATENT NO. : 9,632,604 B2  
APPLICATION NO. : 13/431949  
DATED : April 25, 2017  
INVENTOR(S) : Bradley Neal Suggs Page 1 of 1

It is certified that error appears in the above-identified patent and that said Letters Patent is hereby corrected as shown below:

In Column 10, Line 4, in Claim 16, delete "utilizing, them" and insert -- utilizing them --, therefor.

Signed and Sealed this  
Twenty-sixth Day of September, 2017

Joseph Matal  
*Performing the Functions and Duties of the*  
*Under Secretary of Commerce for Intellectual Property and*  
*Director of the United States Patent and Trademark Office*